(12) United States Patent
Polizotti et al.

(10) Patent No.: US 11,660,672 B2
(45) Date of Patent: May 30, 2023

(54) 3D PRINTING OF HIGH STIFFNESS-TO-WEIGHT REFLECTIVE OPTICS

(71) Applicant: BAE SYSTEMS Information and Electronic Systems Integration Inc., Nashua, NH (US)

(72) Inventors: John J Polizotti, Pittsfield, NH (US); Craig J. Paggi, Pittsfield, NH (US); Michael J. Shaw, Epsom, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 702 days.

(21) Appl. No.: 16/567,481

(22) Filed: Sep. 11, 2019

(65) Prior Publication Data
US 2021/0072434 A1 Mar. 11, 2021

(51) Int. Cl.
| | |
|---|---|
| B22F 5/10 | (2006.01) |
| B22F 10/47 | (2021.01) |
| B33Y 80/00 | (2015.01) |
| B22F 10/60 | (2021.01) |
| B22F 10/64 | (2021.01) |
| B22F 10/66 | (2021.01) |
| B33Y 10/00 | (2015.01) |
| B33Y 70/00 | (2020.01) |
| G06F 113/10 | (2020.01) |

(Continued)

(52) U.S. Cl.
CPC ............... *B22F 5/10* (2013.01); *B22F 10/47* (2021.01); *B22F 10/60* (2021.01); *B22F 10/64* (2021.01); *B22F 10/66* (2021.01); *B33Y 80/00* (2014.12); *B22F 10/28* (2021.01); *B22F 10/80* (2021.01); *B33Y 10/00* (2014.12); *B33Y 70/00* (2014.12); *G06F 2113/10* (2020.01)

(58) Field of Classification Search
CPC .. B22F 5/10; B22F 10/40; B22F 10/80; B22F 2998/10; B22F 2999/00; B22F 10/20; B22F 10/60; B33Y 10/00; B33Y 70/00; B33Y 80/00; B33Y 50/00; B33Y 40/20; G06F 2113/10; G06F 30/23; Y02P 10/25; G02B 5/085; G02B 7/182
See application file for complete search history.

(56) References Cited

U.S. PATENT DOCUMENTS

| | | | |
|---|---|---|---|
| 4,492,669 A * | 1/1985 | Gould | G02B 7/182 |
| | | | 249/177 |
| 9,507,061 B2 * | 11/2016 | Hofmann | B23P 11/00 |
| 11,135,763 B2 * | 10/2021 | Beyerle | H01Q 17/00 |

(Continued)

OTHER PUBLICATIONS

GPI; AlSi10Mg MDS; EOS GmbH-Electro Optical Systems; May 2014 p. 4.*

(Continued)

*Primary Examiner* — Lawrence Averick
(74) *Attorney, Agent, or Firm* — Maine Cernota & Rardin; Gary McFaline

(57) ABSTRACT

A 3D-printed reflective optic providing very high specific stiffness through the utilization of a hollow shelled design, with closed back, filled with high-stiffness internal volumetric space-filling open-cell lattice structures. High-stiffness, structurally-integrated, sacrificial structures are also included for the purposes of reduction or elimination of tooling during post-processing operations.

10 Claims, 13 Drawing Sheets

REFLECTIVE OPTICS A-A CROSS SECTION SCALE VIEW
(LATTICE FILL NOT SHOWN)

(51) Int. Cl.
B22F 10/28 (2021.01)
B22F 10/80 (2021.01)

(56) References Cited

U.S. PATENT DOCUMENTS

| | | | | |
|---|---|---|---|---|
| 2012/0287518 | A1* | 11/2012 | Gershony | G02B 7/183 |
| | | | | 359/853 |
| 2013/0139964 | A1* | 6/2013 | Hofmann | B05D 5/063 |
| | | | | 164/498 |
| 2014/0083160 | A1 | 3/2014 | Flooks et al. | |
| 2014/0247512 | A1 | 9/2014 | Scheiding et al. | |
| 2018/0071979 | A1 | 3/2018 | Achten et al. | |
| 2019/0337220 | A1* | 11/2019 | Beyerle | B29C 64/118 |

OTHER PUBLICATIONS

Hlipert, Design, AM processing mirror made of aluminum silicon alloy, Oct. 27, 2020, SPIE.*

Vanek, Clever Support Efficient Support Structure, 2014, Eurographics Symposium on Geometric Processing.*

Herzog, Optical Fabrication of Lightweighted 3D printed mirrors, Nov. 10, 2015, Optical Engineering.*

Hilpert et al., "Design, additive manufacturing, processing, and characterization of metal mirror made of aluminum silicon alloy for space applications." Optical Engineering vol. 58, Issue 9, pp. 092613 (published May 9, 2019} [online} < https://doi.org/10.1117/1.OE.58.9.092613 >.

Vanek et al. "Clever Support: Efficient Support Structure Generation for Digital Fabrication." Computer Graphics Forum vol. 33, Issue 5, pp. 117-125 (published Aug. 23, 2014) (on line]< https://doi.org/10.1111/cgf.12437 >.

International Search Report, PCT/US20/49806, dated Nov. 30, 2020, 13 pages.

Hartung et al, "Novel applications based on freeform technologies," Proc. SPIE 10692, Optical Fabrication, Testing, and Metrology VI, 106920K (Jun. 5, 2018); doi: 10.1117/12.2313100, http://spiedigitallibrary.org/conference-proceedings-of-spie.

Herzog et al., "Optical fabrication of lightweighted 3D printed mirrors", Optomechanical Engineering 2015, Proc. of SPIE vol. 9573 957308-1, doi: 10.1117/12.2188197, http://proceedings.spiedigitallibrary.org.

Hilpert et al, "Precision manufacuting of a lightweight mirror body made by selective laser meling", Precision Engineering 53 (2018) 310-317, doi: 10.1016/j.precisioneng.2018.04.013.

Stern et al, "Topological Optimization and Methodology for Fabricating Additively Manufactured Lightweight Metallic Mirrors," Solid Freeform Fabrication 2017: Proceedings of the 28th Annual International Solid Freeform Fabrication Symposium—An Additive Manufacturing Conference, 13 pages.

Atkins C et al. Topological design of lightweight additively manufactured mirrors for space, Proc. SPIE 10706, Advances in Optical and Mechanical Technologies for Telescopes and Instrumentation III, 107060I (Jul. 10, 2018), 17 pages; DOI: 10.1117/12.2313353 <http://purl.org/net/epubs/work/38644580>.

* cited by examiner

REFLECTIVE OPTICS APPLICATION

REFLECTIVE OPTICS FABRICATION

REFLECTIVE OPTICS LATTICE STRUCTURE

REFLECTIVE OPTICS BACK PERSPECTIVE VIEW

REFLECTIVE OPTICS FRONT PERSPECTIVE VIEW

REFLECTIVE OPTICS BACK PLAN SCALE VIEW

REFLECTIVE OPTICS A-A CROSS SECTION SCALE VIEW
(LATTICE FILL NOT SHOWN)

800

REFLECTIVE OPTICS SIDE SCALE VIEW

900

SCANNING MIRROR EMBODIMENT FRONT VIEW

1000

SCANNING MIRROR EMBODIMENT REAR VIEW
(TRIPODS REMOVED)

1100

SCANNING MIRROR EMBODIMENT SIDE VIEW

1200

SCANNING MIRROR EMBODIMENT END VIEW

3D PRINTING OF HIGH STIFFNESS-TO-WEIGHT REFLECTIVE OPTICS

FIELD

The disclosure relates to high stiffness-to-weight reflective optics, and more particularly, to 3D printing of a lattice structure within a mirror cavity to reduce or eliminate tooling during post-processing operations.

BACKGROUND

Many optical applications require mirrors designed to maintain exceptional image quality under high inertial loading scenarios that occur during operation. Known optical structures are comprised of beryllium alloy mirrors with machined waffle lightweighting features because of the materials' unique properties for high specific stiffness (i.e. stiffness-to-weight ratio). However, their fabrication often requires expensive tooling and facilities requirements usually associated with diamond machining of optics and handling of toxic materials. As a result, cost, availability, and typical lead times for high-precision beryllium alloy components are also disadvantages of using these high-performance materials.

What is needed is a device, system, and method to provide reflective optics with comparable stiffness-to-weight performance and at a lower cost compared to known beryllium alloy mirrors.

SUMMARY

An embodiment provides a 3D printed high stiffness-to-weight reflective optic comprising an internal mirror cavity located within an exterior mirror shell comprising a closed-face back; the internal mirror cavity comprising a 3-dimensional space-filling volumetric lattice structure; and a plurality of 3D-printed sacrificial integrated structures printed on the close-face back, wherein the 3D-printed sacrificial integrated structures have two or more legs, wherein each the leg comprises an individually frangible segment whereby a top planar surface of each the sacrificial integrated structure is adequately supported by all legs for resisting machining stresses, and each leg is individually severable, whereby each the sacrificial integrated structure is removable upon individual severing of each leg frangible section. In embodiments the 3D printed sacrificial integrated strictures are tripods, the tripods comprising legs with varied lengths and the top planar surface. Other embodiments comprise a powder metal material callout of an AlSi10Mg alloy. In subsequent embodiments the lattice comprises a printed lattice topology selected from triangular hybrid, truncated octahedron, gyroids, cubic truss, octet truss, truncated tetrahedron, and Archimedean solids. For additional embodiments the lattice comprises an open-cell tetragonal printed lattice topology. In another embodiment, the lattice comprises tetragonal unit cells of about 0.40 inch by about 0.40 inch. For a following embodiment, the lattice comprises struts of about 0.040 inch diameter. In subsequent embodiments the mirror has a surface quality greater than or equal to about 64 Root Mean Square (RMS). In additional embodiments the stiffness to weight ratio comprises a specific stiffness of about 150 E/$\rho$ and a Young's modulus of elasticity of about 300 GPa.

Another embodiment provides a method for fabricating a 3D printed high stiffness-to-weight reflective optic comprising defining reflective optical specifications for a surface of the reflective optic; investigating a lattice for a 3-dimensional space-filling volumetric lattice structure to support the reflective optic; creating an assembly model from results of the lattice investigation; printing a mirror assembly from the assembly model, the assembly comprising a plurality of 3D-printed sacrificial integrated support structures printed on a close-face back of the mirror assembly, wherein the 3D-printed sacrificial integrated structures have two or more legs; performing a heat treatment on the printed mirror assembly; machining a mirror surface on the surface of the reflective optic; and removing Foreign Object Debris comprising removing the plurality of sacrificial integrated support structures. In included embodiments the lattice investigation comprises the step of determining weight and stiffness by lattice analysis. In yet further embodiments further comprising the steps of creating a latticed mirror model and assessing printability of the assembly model between the steps of investigating a lattice and creating an assembly. Related embodiments further comprise the steps of validating Finite Element Analysis (FEA) of the assembly model by tap testing and creating an Additive Manufacturing (AM) mirror drawing between the steps of investigating a lattice and creating an assembly. For further embodiments creating the assembly comprises the step of locating a mirror cavity in an exterior mirror shell with 0.030 inch interference fit between the exterior mirror shell and the mirror cavity. In ensuing embodiments the step of printing the mirror assembly comprises a powder metal material callout of an AlSi10Mg alloy. For yet further embodiments, the step of removing the plurality of sacrificial integrated support structures comprises severing an individually frangible segment of each leg of each sacrificial integrated support structure whereby each the sacrificial integrated support structure is removed. For more embodiments, the step of performing heat treatment comprises the steps of Hot Isostatic Press (HIP); and Solution Heat Treatment. In continued embodiments the step of machining a mirror surface comprises the steps of rough machining, stress relief, final machining, solution heat treatment, and finishing. For additional embodiments, the step of machining the mirror comprises a surface quality greater than or equal to about 64 Root Mean Square (RMS).

A yet further embodiment provides a 3D printed high stiffness-to-weight reflective optic comprising providing the mirror by defining reflective optical specifications for a surface of the reflective optic; investigating a lattice for a 3-dimensional space-filling volumetric lattice structure to support the reflective optic; creating an assembly model from results of the lattice investigation; printing a mirror assembly from the assembly model, the assembly comprising a plurality of 3D-printed sacrificial integrated support structures printed on a close-face back of the mirror assembly, wherein the 3D-printed sacrificial integrated structures have two or more legs; performing a heat treatment on the printed mirror assembly; machining a mirror surface on the surface of the reflective optic; and removing Foreign Object Debris comprising removing the plurality of sacrificial integrated support structures, the step of removing the plurality of sacrificial integrated support structures comprising severing an individually frangible segment of each leg of each sacrificial integrated support structure; wherein dimensions of the surface of the reflective optic are about 9.75 by 5.8 inches, and a surface quality is greater than or equal to about 64 Root Mean Square (RMS).

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes, and not to limit in any way the scope of the inventive subject matter. The invention is susceptible of many embodiments. What follows is illustrative, but not exhaustive, of the scope of the invention.

Figure 1:
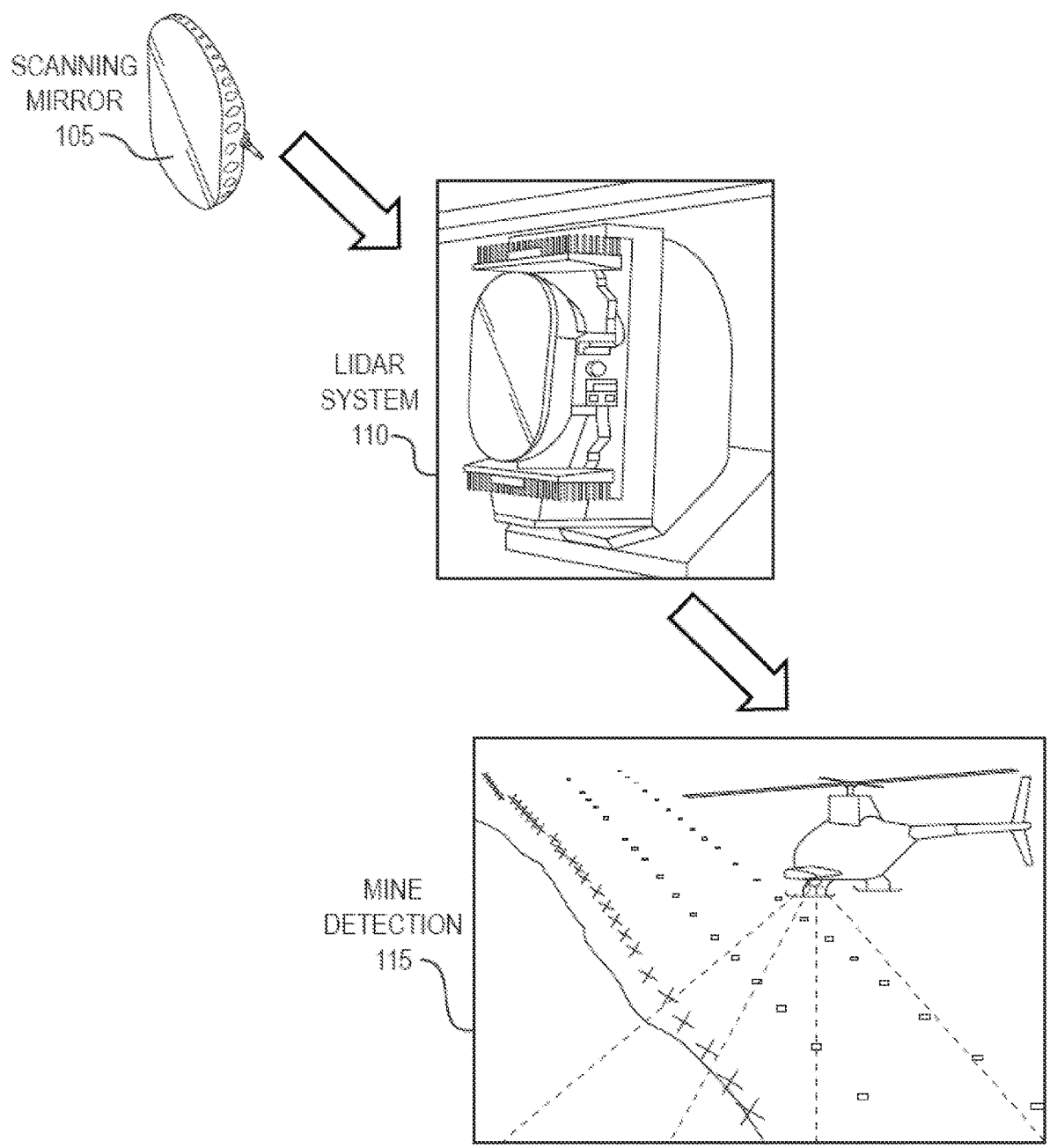
FIG. 1 illustrates a reflective optics application configured in accordance with an embodiment.

FIG. 1 illustrates a reflective optical application 100. In this embodiment, scanning mirror reflective optic 105 is a component of Light Detection and Ranging (LIDAR) system 110. LIDAR system 110 is employed, for example, in airborne detection of mines 115. The scanning mirror for such missions is a high precision highly reflective surface with high stiffness-to-weight ratio to maintain image quality. The fast scanning motion induces high inertial loading and causes distortion if the mirror is not adequately stiff. In operation of the LIDAR system, the mirror operates on a 2 or more axis scan assembly and reflects laser energy in order to illuminate an object or surface such that the reflection is then measured and processed. Most recently, LIDAR systems are also being used in autonomous vehicles. In some high performance applications, the scanning mirror is made of beryllium or a beryllium alloy due to its characteristics for creating a stiff surface.

Replacement of an exotic (beryllium alloy), high performance mirror material with a conventional lower performance material (aluminum alloy) while preserving its overall structural performance and system requirements is exceedingly difficult with conventional techniques. According to one example, the efficient structural design is fabricated by additive manufacturing (AM), also referred to herein as 3D printing which includes a number of processes including direct metal laser sintering (DMLS) among others. In embodiments, sacrificial tripods are "grown" directly into the back surface of the mirror to be used as temporary fixturing for diamond machining process. These are 3D printed on the structure, and removed after the diamond turning process. This technique eliminates the need for expensive tooling usually associated with diamond machining of optics. In addition, specific heat treatment methods attain fine grain structure and dimensional stability required for production of optical quality mirrors.

Additive manufacturing allows the use of internal lattice structures and hollow core construction not possible with conventional machining. Embodiments use 3D printed features (tripods) on the back of the part to aid in the final machining. The tripods provide built in support for the part for diamond turning of the mirror to final required specifications.

As noted, beryllium alloy mirrors are extremely expensive structures to machine. In contrast, 3D printing of a lattice structure within a mirror cavity that is designed to have the same approximate stiffness to weight ratio as the traditional beryllium alloy design (a specific stiffness of about 150 E/$\rho$ and a Young's modulus of elasticity of about 300 GPa in embodiments) greatly reduces the cost of manufacturing without compromising performance. In embodiments, the lattice is an open-cell lattice. In addition, tripods grown into the back of the mirror allow for diamond turning. Without these tripods, significant added cost would be incurred. This technique can be employed for many other applications that use additive manufactured parts, but is especially effective on optical mirror fabrication.

In one example, the final lattice geometry can be optimized by conducting a series of printability and structural modal testing assessments. Sample portions of the lattice in the present system were additively manufactured and qualitatively evaluated for characteristics such as warping, unconnected lattice members, geometric anomalies, modal response, and dimensional accuracy.

In embodiments, the diameter of the lattice strut members affected the overall printability of the model as the natural frequency is very sensitive to lattice strut diameter.

Embodiments employ a tetragonal truss printed lattice topology for the mirror. Many options are also possible such as triangular hybrid, truncated octahedron, gyroids, cubic truss, octet truss, truncated tetrahedron, and other Archimedean solids. Design criteria include weight, stiffness, and strength. In embodiments, unit cell size selection is important to decrease the size of the unsupported horizontal regions.

Figure 2:
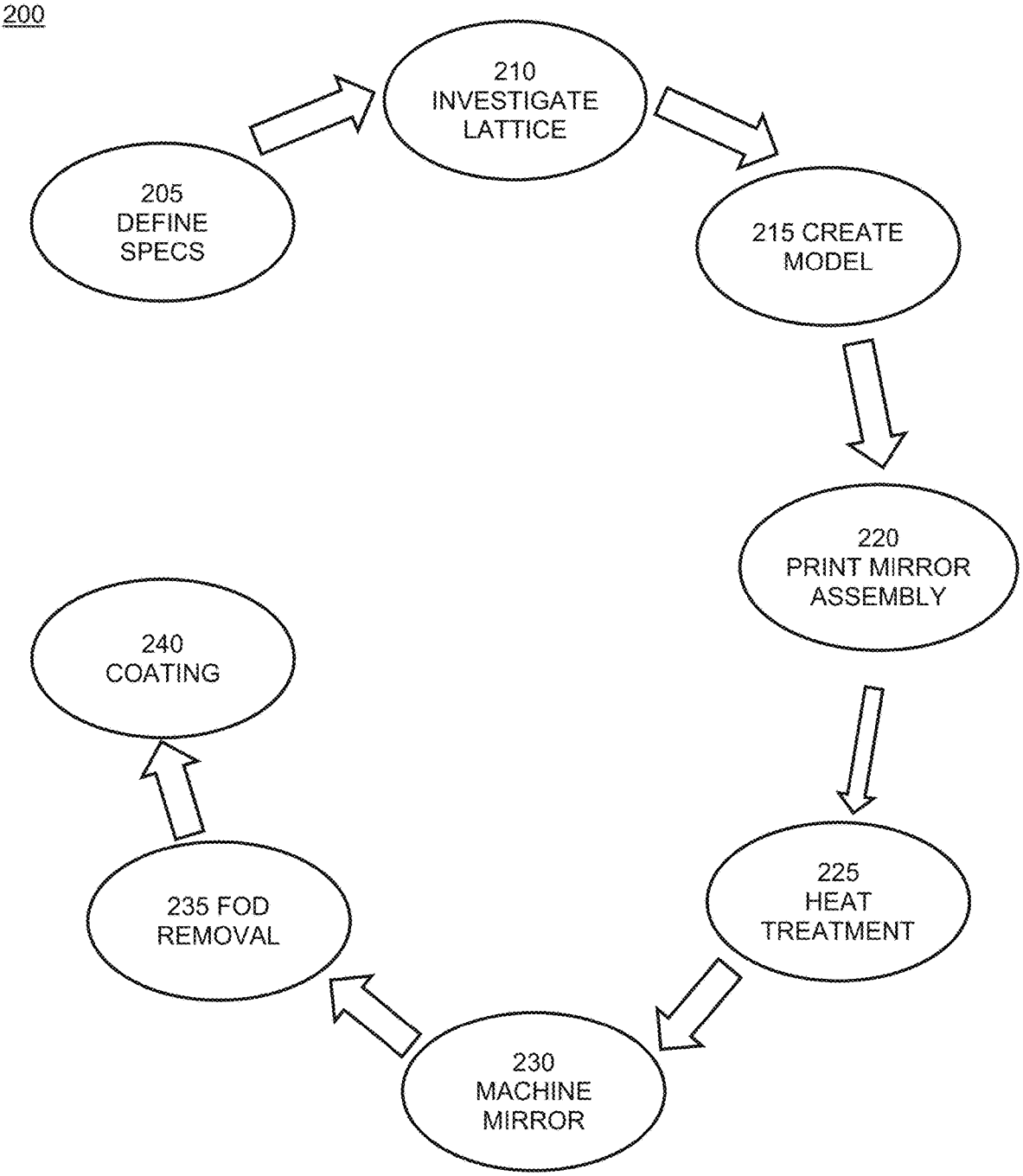
FIG. 2 is a generalized method for manufacturing reflective optics configured in accordance with an embodiment.

FIG. 2 is a generalized method for manufacturing reflective optics 200 according to one embodiment of the present technique. Steps comprise defining reflective optical specifications 205 for the specific application and design criteria. For example, the size, weight, stiffness, and reflectivity are some of the variables that are used for the specification. The lattice investigation including topology 210 is considered in order to design the optimal lattice geometry. There are various simulation tools Computer Aided Design and Finite Element Analysis (CAD and FEA) such as Creo, Netfabb and NX that facilitate the design phase and allow iterations to better define the lattice. Such tools enable a lattice analysis to assess the weight and stiffness parameters. In one example, lattice finite element analysis (FEA) was created for the lattice topology and ran as a free-free modal and compared the natural frequencies. Parameters include size (cubic), cell dimensions, strut thickness, Young's modulus, and density. In embodiments the software tool importantly incudes each of: Organic topology optimization, STL File Repair, Part Orientation and Support Optimization, Multi-Physics AM Process Simulation, and Build Failure Prediction. Netfabb includes these. These are important because creating lattice geometries with high stiffness-to-weight ratio must be an efficient and reliable process to enable rapid design iteration. For example, creating lattice strut members as individual Creo part files and patterning the geometry has several drawbacks. It is nearly impossible to update or modify the lattice topology, it is very difficult to change connections with solid body features without starting over with the design, and it is very inefficient for iterative design and optimization. Further, it is impossible to model structures such as the triangular hybrid, the Bucky ball, the tetragonal, and the octet truss with 3D elements due to element count and run time. For embodiments, strut members are analyzed as 1D FEA beam elements, reducing the element count, making analysis possible.

Once the lattice structure meets the requirements, the mirror model with the internal lattice features is created 215. According to one example, two parts were created to lattice topology. One part is the exterior mirror shell and the other is the mirror cavity. Once combined, the shell and the cavity are completed and the deign build is exported, for example as an .stp for Netfabb.

Once the build file is imported into the build environment, the solid mirror cavity section can be built. The desired unit lattice cell was generated and then patterned inside the mirror cavity. Once the cavity was latticed, the lattice can be positioned within the mirror shell and aligned.

The steps continue with printing mirror assembly (mirror cavity and mirror shell with tripods) 220; performing heat treatment 225; machining mirror 230; and tripod and Foreign Object Debris (FOD) removal 235. According to one embodiment, the reflective optic is subject to a coating 240. The coating helps preserve the reflective properties.

Figure 3:
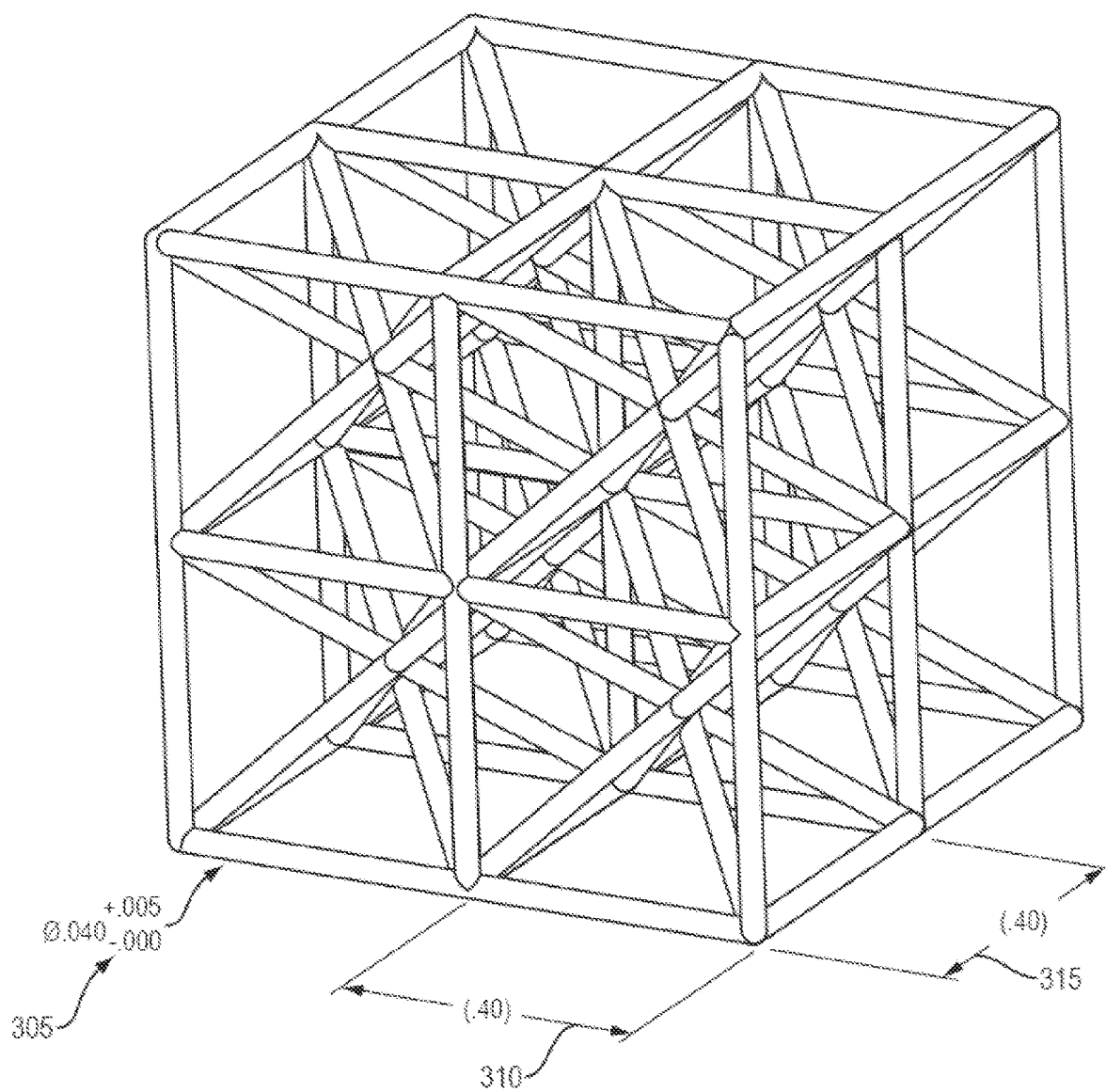
FIG. 3 depicts a reflective optics lattice structure configured in accordance with an embodiment.

FIG. 3 depicts a reflective optics lattice structure 300. In embodiments, tetragonal lattice dimensions comprise strut diameter 305 of 0.040 inch; unit-cell dimensions of 0.40 inch 310 by 0.40 inch 315. In other embodiments, unit cells based on truncated octahedron geometries comprise 0.040" strut dimensions and 0.50" unit cell dimensions. These dimensions provide the required stiffness properties for the mirror function. As mentioned, for embodiments, the lattice is an open-cell lattice.

Figure 4:
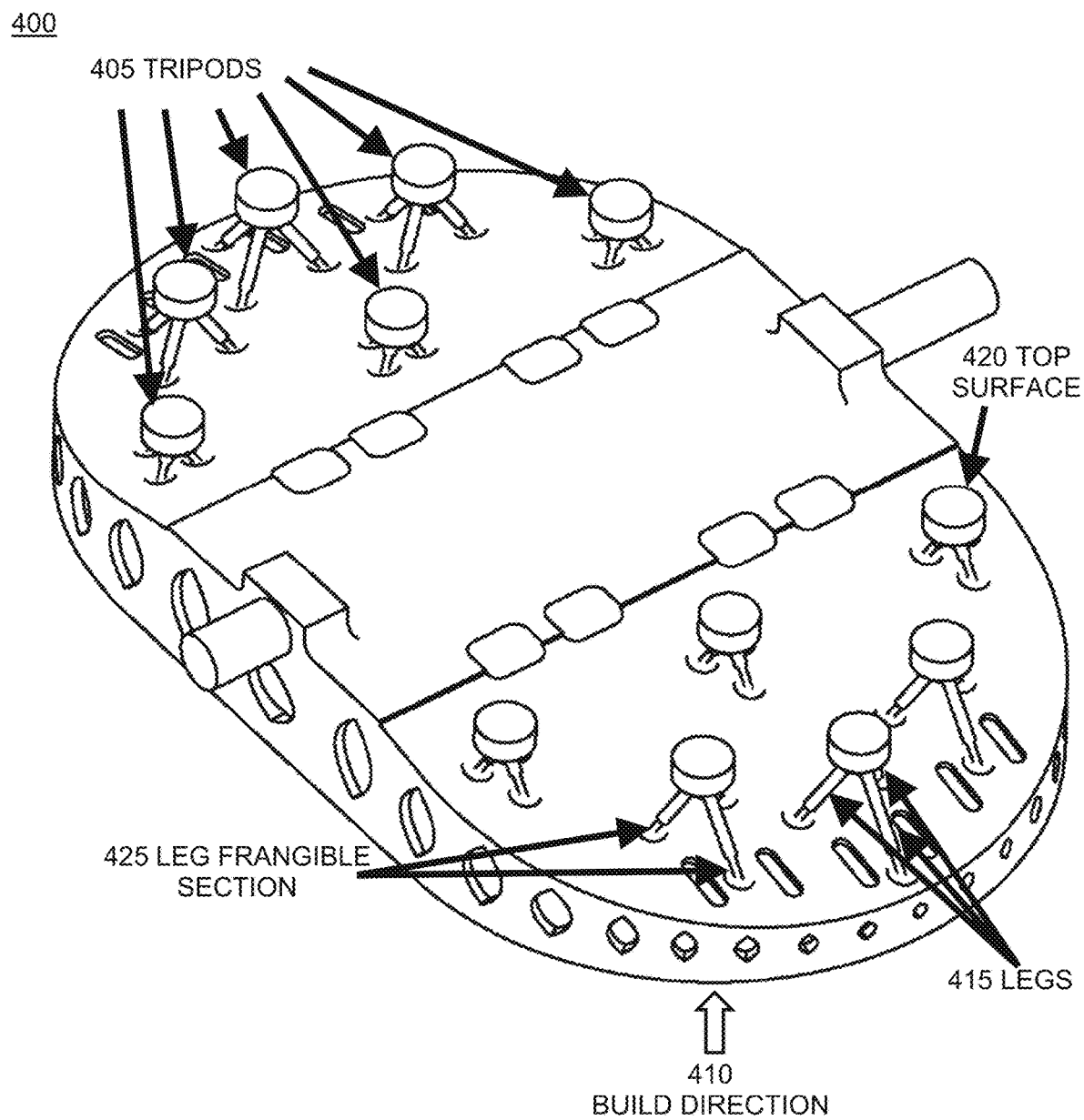
FIG. 4 is a reflective optics back perspective view configured in accordance with an embodiment.

FIG. 4 is a reflective optics back perspective scale view 400. Illustrated are tripods 405 (one end only) and build direction 410. Depicted tripods are sacrificial structures comprising legs 415 and top surface 420. In embodiments, top surfaces 420 are planar to provide required support for machining, such as diamond turning of the optical surface. By having two or more legs having a thinner dimension as compared to the total size of the top surface, the structures are easily removed such as by simple mechanical tools. In embodiments, legs 415 comprise frangible sections 425 to enable removal. Due to leg frangible sections 425, sacrificial structures (tripods) can be removed by simple means such as manually with wire cutters. No specialized tooling or machining is required to remove them. The number and location of structures 405 are established for the particular mirror assembly to minimize deflections in the part during optical finishing, which is critical to getting good surface quality in the first few passes versus multiple passes. This results in better surface figure and finish compared to mirrors having only one-tenth the surface area. In one example an equal number of structures are provided on both side sections of the back side, with no structures in the middle section. In one example there are between 4-8 structures on either side portion.

Figure 5:
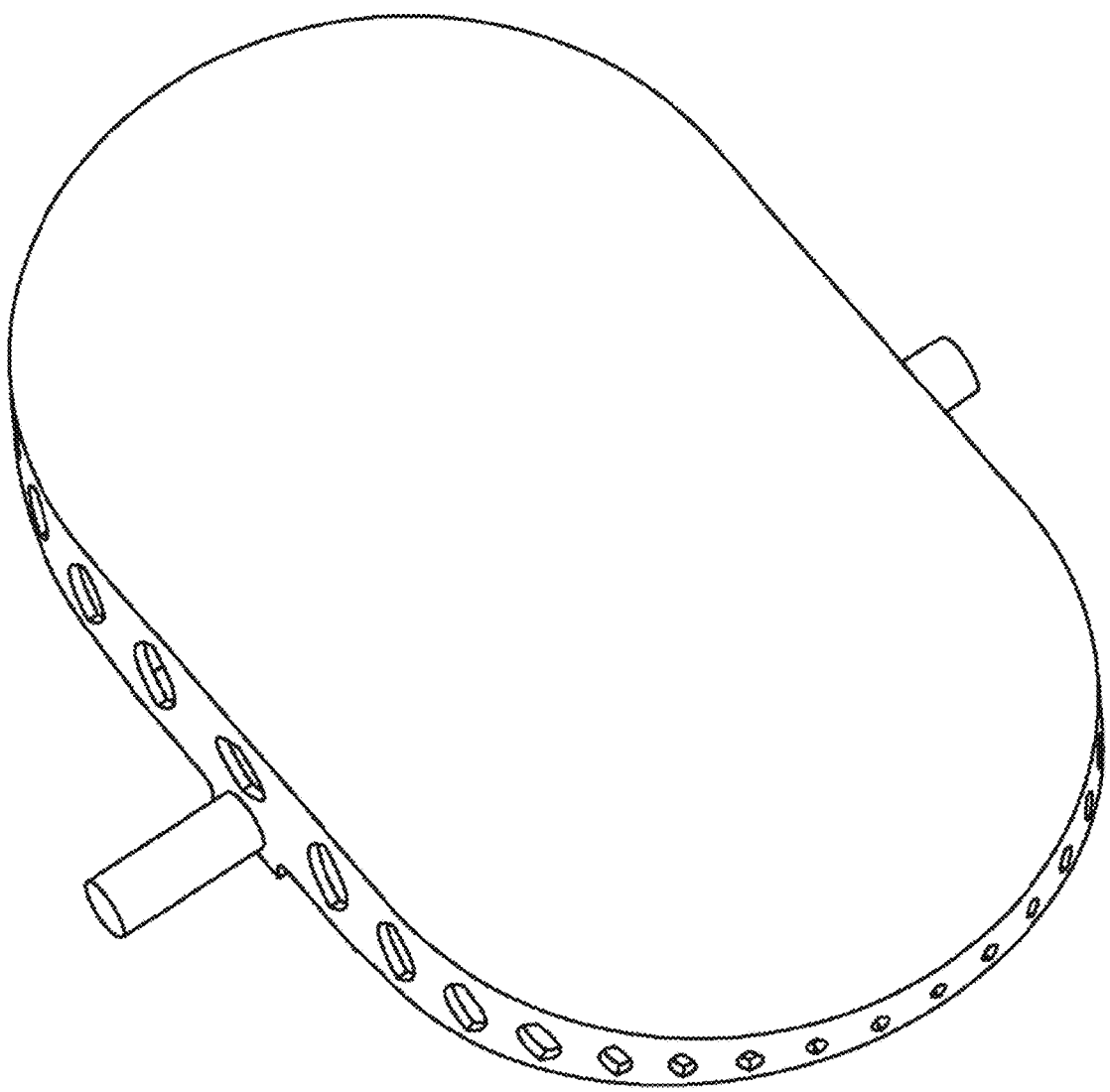
FIG. 5 is a reflective optics front perspective view configured in accordance with an embodiment.

FIG. 5 is a reflective optics front perspective scale view 500.

Figure 6:
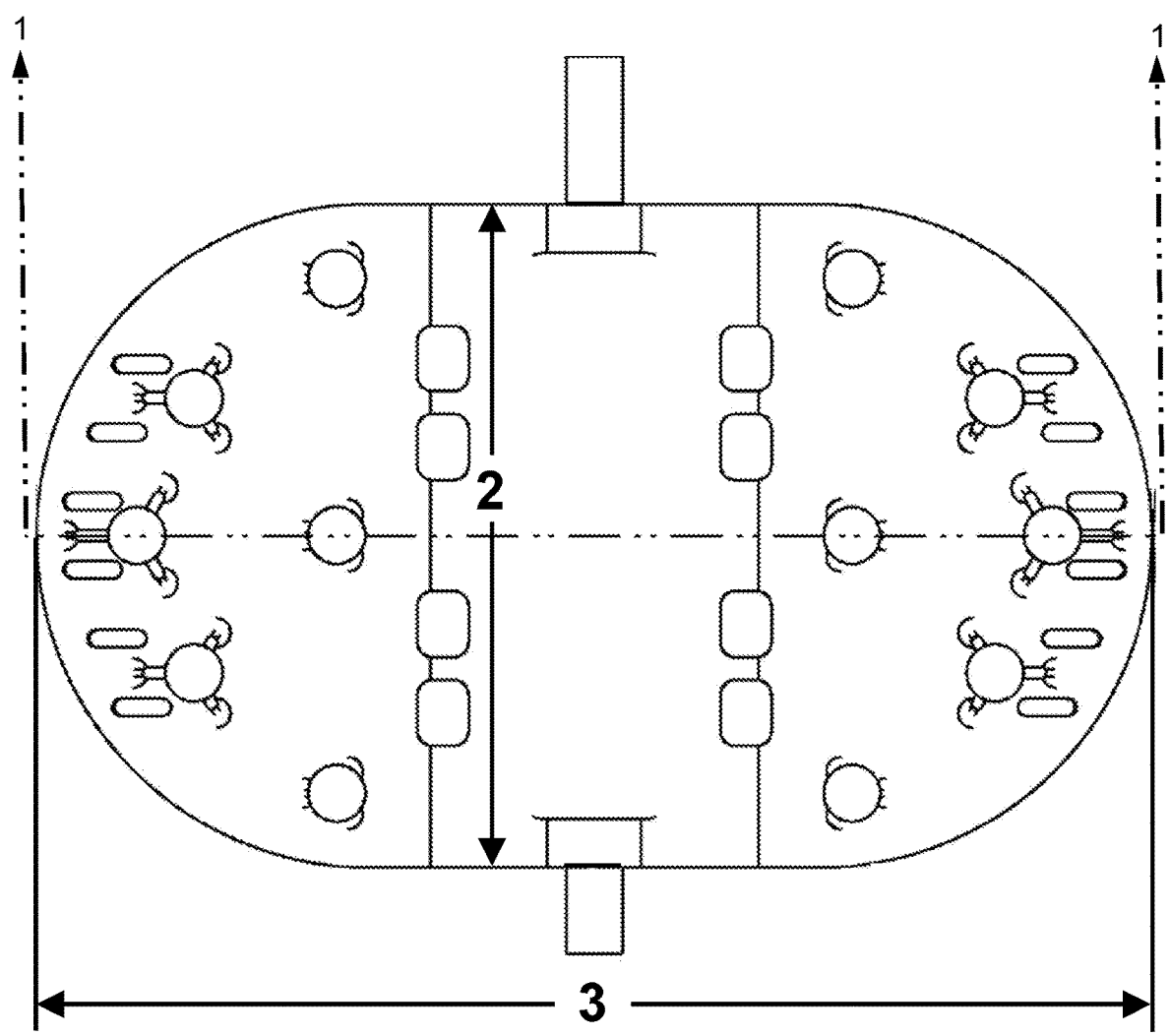
FIG. 6 is a reflective optics back plan scale view configured in accordance with an embodiment.

FIG. 6 is a reflective optics back plan scale view 600. Embodiment dimensions are overall length 9.75 inches (2) and width 5.81 inches (3).

Figure 7:
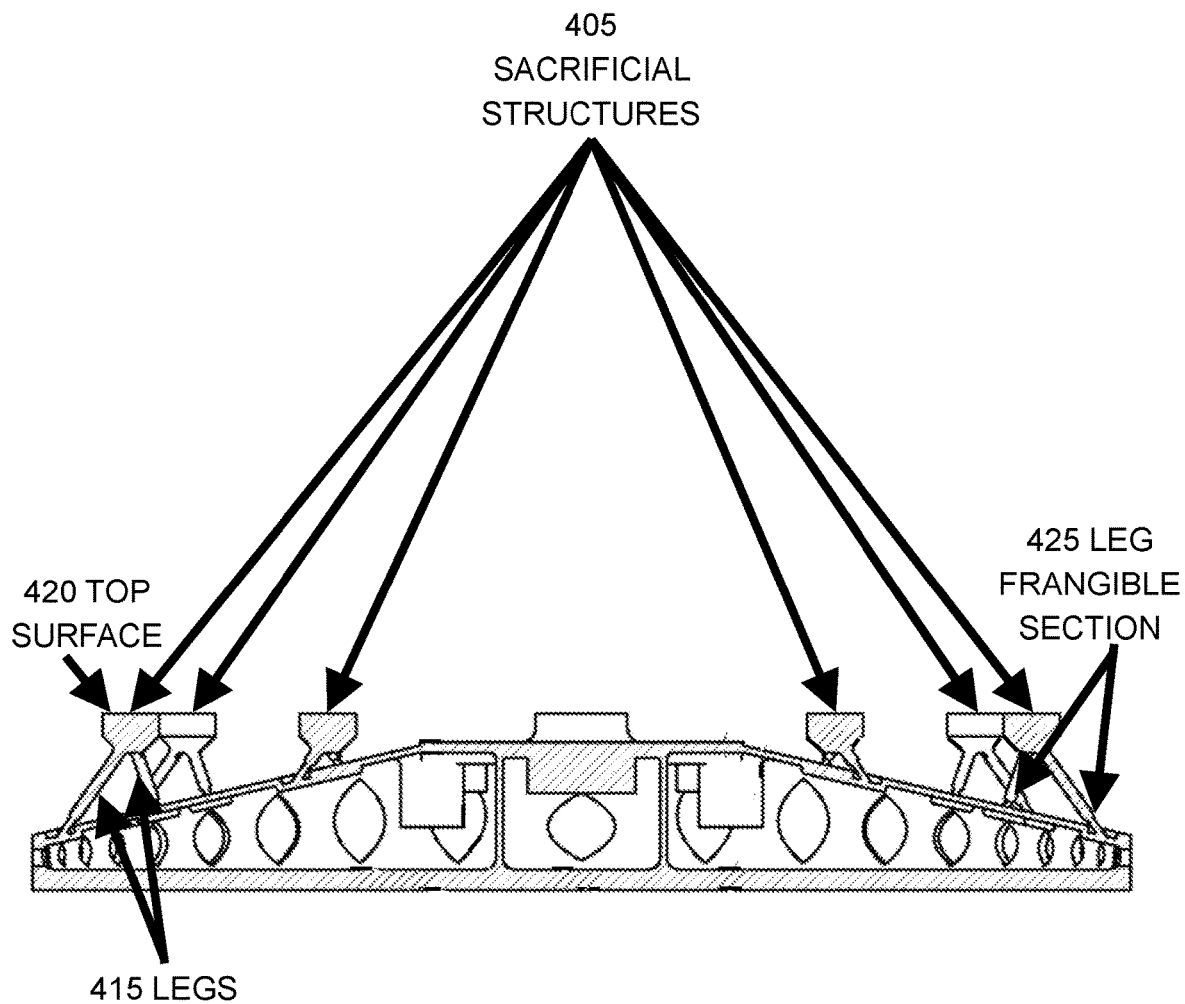
FIG. 7 is a reflective optics A-A cross section scale view configured in accordance with an embodiment.

FIG. 7 is a reflective optics 1-1 cross section scale view 700 of FIG. 6. Internal volumes are filled with lattice structure (not shown). As noted, sacrificial structures 405 have legs 415, with frangible sections 425, of varying lengths so that the top surface 420 of structures 405 are approximately planar.

Figure 8:
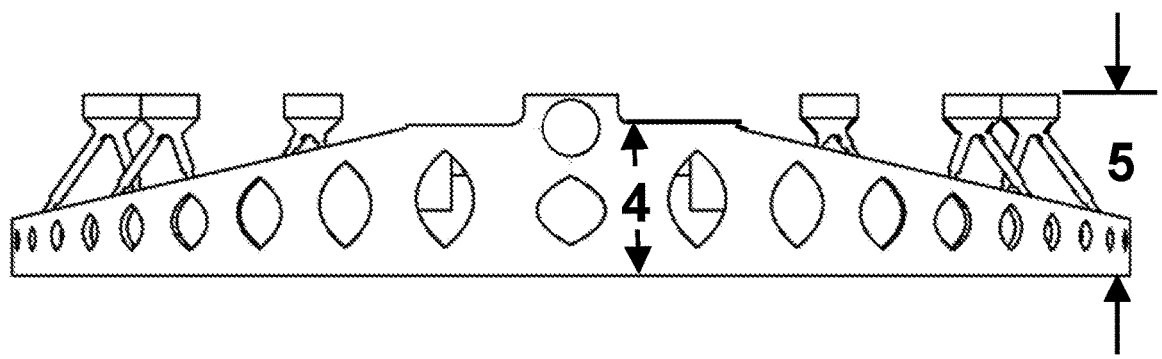
FIG. 8 is a reflective optics side scale view configured in accordance with an embodiment.

FIG. 8 is a reflective optics side scale view 800. Embodiment dimensions comprise a front to back thickness of 1.32 inches (4) and 1.58 inches (5) face to tripod surface.

Figure 9:
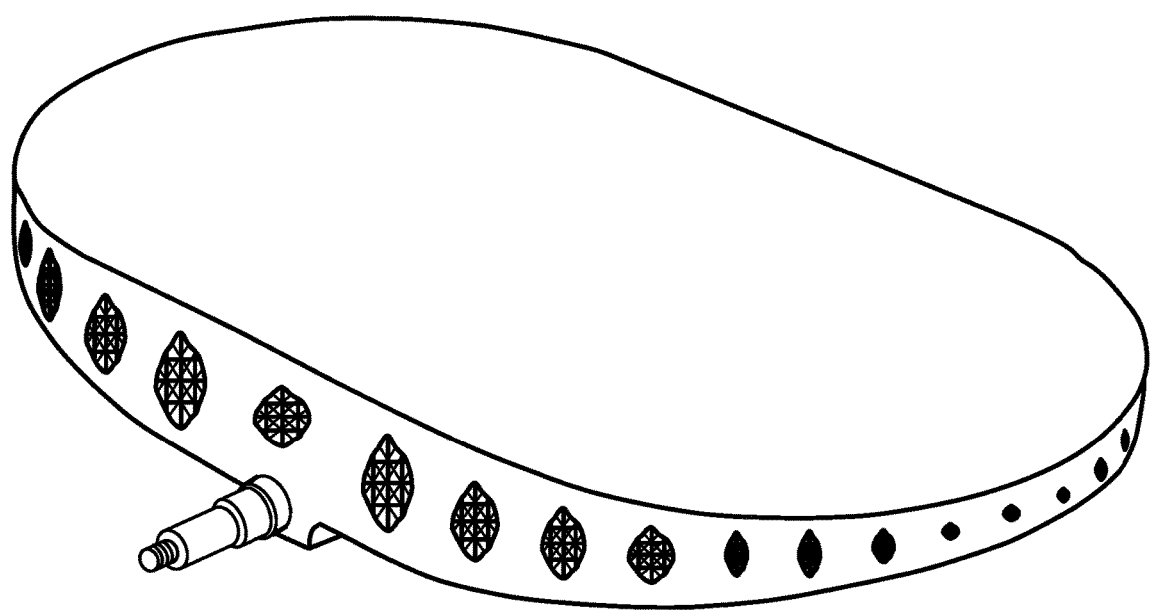
FIG. 9 is a scanning mirror front view configured in accordance with an embodiment.
Figure 10:
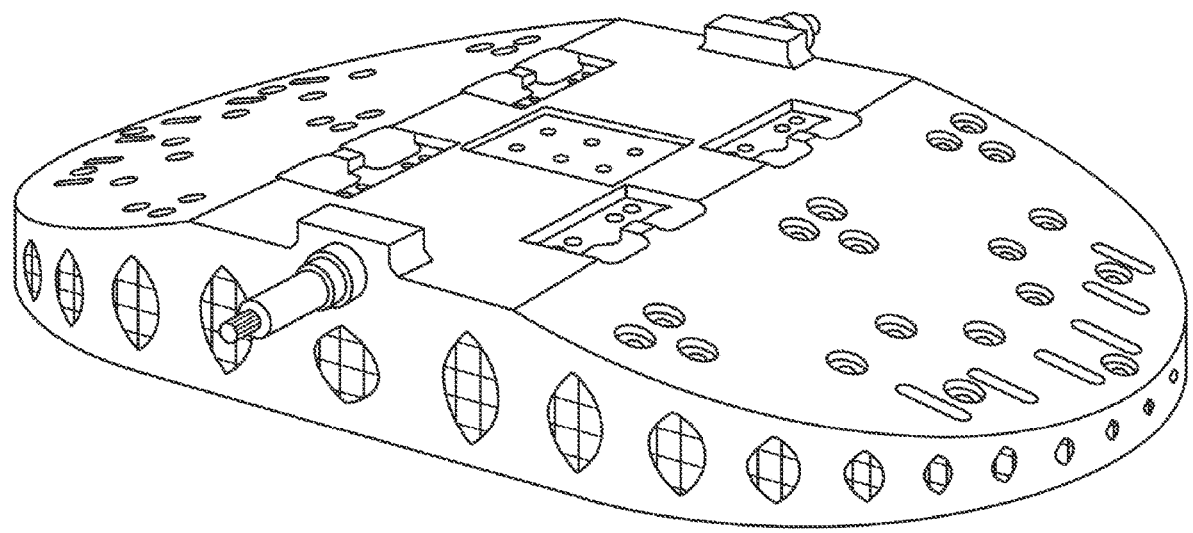
FIG. 10 is a scanning mirror back view configured in accordance with an embodiment.
Figure 11:
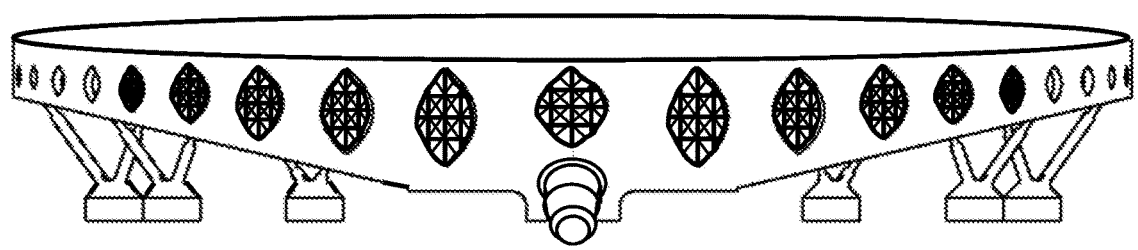
FIG. 11 is a scanning mirror side view configured in accordance with an embodiment.
Figure 12:
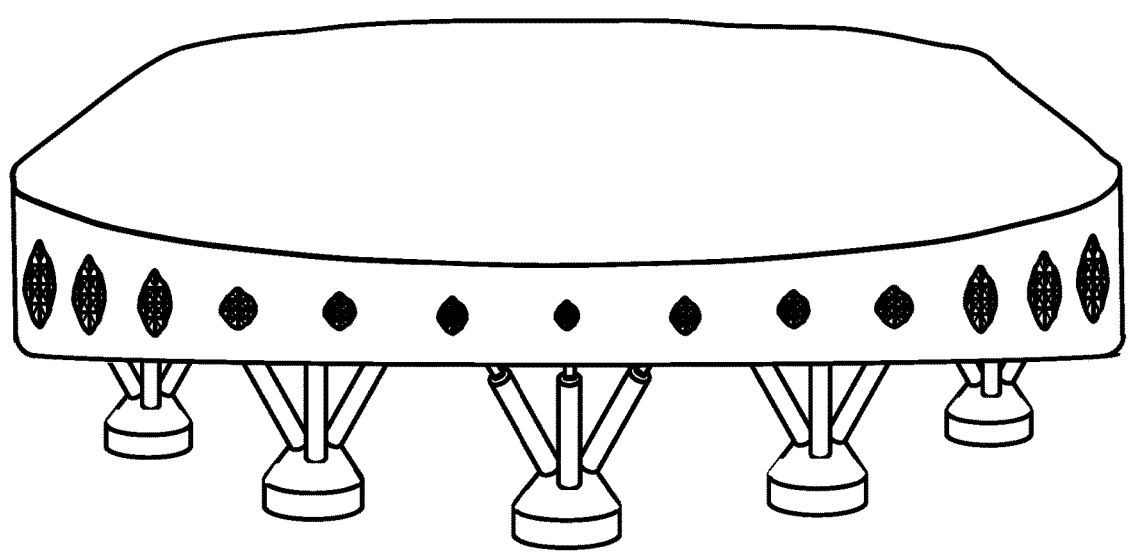
FIG. 12 is a scanning mirror end view configured in accordance with an embodiment.
Figure 13:
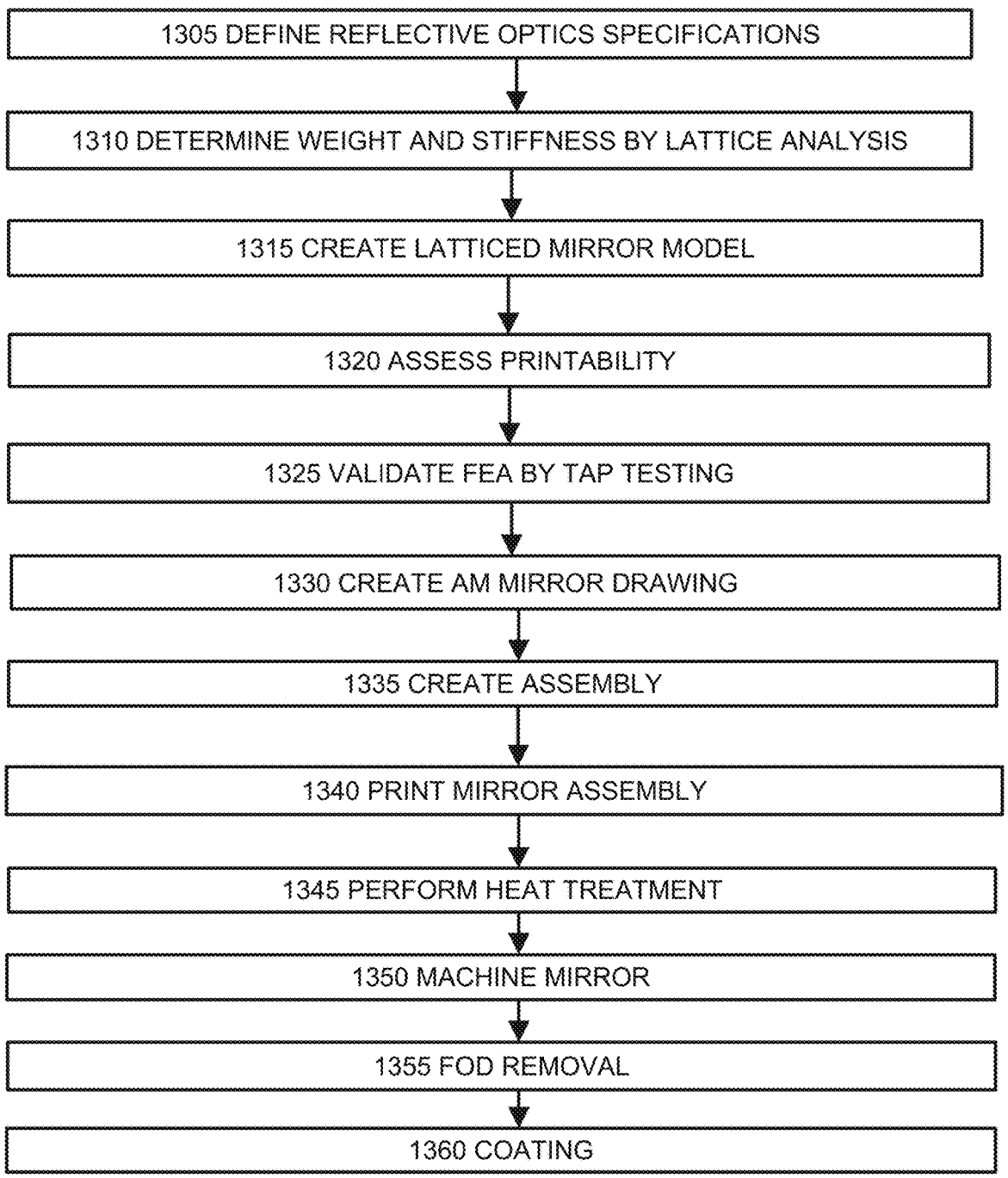
FIG. 13 is a flow chart for a reflective optics fabrication method configured in accordance with an embodiment.

FIG. 9 is a scanning mirror embodiment front view 900.
FIG. 10 is a scanning mirror embodiment back view 1000.
FIG. 11 is a scanning mirror embodiment side view 1100.
FIG. 12 is a scanning mirror embodiment end view 1200.
FIG. 13 is a flow chart for a reflective optics fabrication method embodiment 1300. Steps comprise defining reflective optical specifications 1305, which can include, for example, size, weight, stiffness, and reflectivity, depending on specific application and design criteria; lattice analysis 1310, including topology, determining weight and stiffness for the optimal lattice geometry. Following the lattice investigation, creating latticed mirror model 1315, with the internal lattice features. Embodiment mirror models comprise two parts, the exterior mirror shell, and the mirror cavity. The created mirror model is assessed for printability, including build direction, support structure location, and machine process settings 1320. In embodiments next is validating FEA by tap testing 1325. Then creating additive manufacturing mirror drawings 1330. In embodiments this is followed by creating the assembly by locating the mirror cavity in the exterior mirror shell with, in embodiments, a 0.030 inch interference fit between the shell and the cavity 1335; printing the mirror assembly (mirror cavity and mirror shell with tripods) having a powder metal material callout of AlSi10Mg alloy 1340. The 3D printed sacrificial integrated (tripod) structures are printed on the close-face back. Next are performing heat treatment comprising stress relief, Hot Isostatic Press (HIP), and Solution Heat Treatment 1345; machining the mirror comprising rough machining, stress relief, final machining, solution heat treatment, and finishing 1350; Foreign Object Debris (FOD) removal 1355; and optional coating 1360 to protect the reflective properties of the mirror surface. The 0.030 inch interference fit is important as being sufficient for making solid lattice connections to the shell. In embodiments, step 1335, FOD removal, comprises severing each leg of each sacrificial support structure, thereby removing them without specialized tooling or machining. Each leg comprises an individually frangible segment whereby the planar surface is adequately supported by all legs for resisting machining stresses, and each leg is individually severable. This reduces the required tooling and fixturing. As mentioned, the sacrificial support structures are established for the particular mirror assembly to minimize deflections in the part during optical finishing, which is critical to getting good surface quality in the first few passes versus multiple passes. This results in better surface figure and finish compared to mirrors having only one-tenth the surface area. One measure, RMS, is the Root Mean Square average of the profile height deviations from the mean line, recorded within the evaluation length (see ASME B46.1). In embodiments, RMS is greater than or equal to about 64 RMS.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of the embodiments has been presented for the purposes of illustration and description. It is not intended to be exhaustive or to limit the invention to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A 3D printed high stiffness-to-weight reflective optic comprising:
    an internal mirror cavity located within an exterior mirror shell comprising a closed-face back;
    said internal mirror cavity comprising a 3-dimensional space-filling volumetric lattice structure; and
    a plurality of 3D-printed sacrificial integrated structures printed on said close-face back, wherein said 3D-printed sacrificial integrated structures have two or more legs,
    wherein each said leg comprises an individually frangible segment whereby a top planar surface of each said sacrificial integrated structure is adequately supported by all legs for resisting machining stresses, and each leg is individually severable,
    whereby each said sacrificial integrated structure is removable upon individual severing of each leg frangible section.

2. The device of claim 1 wherein said 3D printed sacrificial integrated strictures are tripods, said tripods comprising legs with varied lengths and said top planar surface.

3. The device of claim 1 comprising a powder metal material callout of an AlSi10Mg alloy.

4. The device of claim 1 wherein said lattice comprises a printed lattice topology selected from triangular hybrid, truncated octahedron, gyroids, cubic truss, octet truss, truncated tetrahedron, and Archimedean solids.

5. The device of claim 1 wherein said lattice comprises an open-cell tetragonal printed lattice topology.

6. The device of claim 1 wherein said lattice comprises tetragonal unit cells of about 0.40 inch by about 0.40 inch.

7. The device of claim 1 wherein said lattice comprises struts of about 0.040 inch diameter.

8. The device of claim 7 wherein said mirror has a surface quality greater than or equal to about 64 Root Mean Square (RMS).

9. The device of claim 1 wherein said stiffness to weight ratio comprises a specific stiffness of about 150 E/ρ and a Young's modulus of elasticity of about 300 GPa.

10. A 3D printed high stiffness-to-weight reflective optic comprising:
    providing a mirror by:
        defining reflective optical specifications for a surface of said reflective optic;
        investigating a lattice for a 3-dimensional space-filling volumetric lattice structure to support said reflective optic;
        creating an assembly model from results of said lattice investigation;
        printing a mirror assembly from said assembly model, said assembly comprising a plurality of 3D-printed sacrificial integrated support structures printed on a close-face back of said mirror assembly, wherein said 3D-printed sacrificial integrated structures have two or more legs, wherein each said leg comprises an individually frangible segment whereby a top planar surface of each said sacrificial integrated structure is adequately supported by all legs for resisting machining stresses;
        performing a heat treatment on said printed mirror assembly;
        machining a mirror surface on said surface of said reflective optic; and
        removing Foreign Object Debris comprising removing said plurality of sacrificial integrated support structures, said step of removing said plurality of sacrificial integrated support structures comprising severing an individually frangible segment of each leg of each sacrificial integrated support structure;
    wherein dimensions of said surface of said reflective optic are about 9.75 by 5.8 inches, and a surface quality is greater than or equal to about 64 Root Mean Square (RMS).

* * * * *